United States Patent Office 3,455,776
Patented July 15, 1969

3,455,776
METHOD FOR SWELLING AND DISPERSING COLLAGEN
Sidney Gister, Highland Park, and Richard L. Kronenthal, Fair Lawn, N.J., assignors to Ethicon, Inc., a corporation of New Jersey
No Drawing. Continuation-in-part of application Ser. No. 343,501, Feb. 10, 1964. This application Jan. 24, 1967, Ser. No. 611,223
Int. Cl. D01c $3/00$
U.S. Cl. 162—2      8 Claims

ABSTRACT OF THE DISCLOSURE

Particles of collagen are immersed in a 0.13 to 1.5 molar aqueous solution of a borohydride for 4 to 18 hours at a temperature of 7° C.–36° C. The collagen is then washed and swollen in a dilute aqueous acid-methanol solution. The swollen collagen fibrils disperse readily throughout the swelling solution when agitated.

---

The present application is a continuation-in-part of copending application Ser. No. 343,501, filed Feb. 10, 1964 (now abandoned). This invention relates to the swelling of collagen and more particular to an improved method of preparing a homogeneous dispersion of swollen collagen fibrils from connective tissue whereby collagenous material is treated with a solution of soluble borohydride and is then swollen in an acid solution. It has been discovered that collagen which has been so treated may be rapidly and substantially completely dispersed in an aqueous acid solution with minimum degradation of the collagen. Dispersions of swollen collagen fibrils prepared by the method to be described are useful in the manufacture of extruded collagen sutures of the type described in U.S. Patent No. 3,114,372.

Numerous attempts over many years have been made to utilize mammalian connective tissue, such as, tendons and hide, as a source of collagen for the preparation of collagen articles in the form of films, tubes, casings, sponges, and the like, and particularly for the preparation of collagen strands for use in suturing and ligating. Crude collagenous materials have been treated by physical means to remove extraneous matter including fat and muscle tissue, swollen in dilute acid or alkali, macerated by physical means and then dispersed in a dilute aqueous acid solution. Non-dispersible matter was removed from the dispersion of collagen and the purified dispersion was treated in a variety of ways to produce the desired shaped collagen article. Collagen sutures have been produced by extruding such a dispersion in a continuous manner into a liquid, such as, acetone, which is capable of precipitating the collagen in the dispersion. Collagen sutures prepared by this method have, however, been characterized by marked degradation of the collagen and a decrease in tensile strength that is not acceptable to the surgical profession. The loss of tensile strength is believed to be caused by degradation of the collagen molecules or aggregates of collagen molecules present in the connective tissue during preparation of the dispersion.

Attempts have been made to minimize degradation of native collagen during the preparation of collagen dispersions by using only small amounts of acid or alkali in preparing the collagen dispersion and also by preparing the dispersions at at low temperature. However, such changes in the process have not, of themselves, produced the desired result. The use of weaker acids or a lower concentration of acid and the preparation of the dispersion at a low temperature will increase the time required to form a homogeneous dispersion. Any increase in the time required to disperse collagen in a suitable solvent also results in changing of the native collagen structure.

A procedure for obtaining a homogeneous dispersion of substantially pure collagen fibrils ise described and claimed in U.S. Patent No. 2,973,302. In that process, the collagenous material is comminuted and treated with an elastase at a temperature within the range of from 5° C. to 45° C., the pH of the treating solution being within the range of from 5 to 9. Following this treatment, the elastase absorbed on the residual collagen is removed, and the collagenous material may then be easily dispersed in an aqueous acid solution. Such dispersions are suitable for extrusions and will produce shaped articles having excellent tensile strength. However, elastases, such as ficin, pinguinain, etc., are non-crystalline enzymes, the purity, strength, and activity of which may vary depending on the source of the enzyme, the time of year that it is produced, and the method and care used in isolation. Some variation in the enzyme treatment process is, therefore, unavoidable because of the variability that is inherent in all biological products of this nature.

It is an object of the present invention to prepare a dispersion of purified undegraded collagen from collagen tissue.

It is another object of the present invention to swell collagenous material in an aqueous acid solution under controlled conditions that are readily reproducible.

It has now been discovered that if thin slices of collagenous material are treated with a solution of an alkali metal borohydride or with a quaternary ammonium salt, such as, tetramethyl ammonium borohydride, the collagen fibrils may then be swollen and readily dispersed in a suitable solvent with minimum degradation. The great ability of collagen to swell and disperse in acids is well recognized once the original environment of the collagen is modified. It is the method of isolating the collagen, fibrils from that original environment in an economical manner, both with respect to yield and preservation of the original fibril structure, that is the subject matter of the present invention.

Suitable alkali metal borohydrides for use in the present invention are sodium borohydride and potassium borohydride. These compounds are dissolved in water to produce an aqueous solution containing from 0.5 percent to 5.2 percent by weight of the active reagent (0.13 to 1.5 molar). Collagen sliced to a thickness of 10–25 mils, or reduced to particles of similar size by any suitable mechanical means, is then immersed in the alkali metal borohydride solution for 4 to 18 hours. The temperature of the alkali metal borohydride solution may vary from 7° C. to 36° C. The fact that this process is not critically sensitive to temperature is an important advantage as it is unnecesary to install plant equipment to maintain the water temperature constant.

The effect that alkali metal borohydride solutions have on the swelling of collagen in acid solution is arbitrarily expressed throughout this patent specification as the "swelling index" and may be determined from the formula:

$$S=W/D$$

in which S is the swelling index; D is the weight of the swelling solution that is absorbed by the collagen during the swelling step; and W is the dry weight of the collagen prior to swelling. Throughout the examples and tables that follow, all quantities are expressed in parts by weight, unless otherwise indicated; and the swelling solution used is a solution of 0.4 percent cyanoacetic acid dissolved in a 50—50 mixture of water and methanol.

Example I

Bovine tendon (branches of the deep flexor tendon) containing a large percentage of material that does not swell in acid solution is sliced to a thickness of 10 to 25 mils. To 100 parts of a one molar solution of sodium borohydride maintained at a temperature of 36° C. is added 2.231 parts of the tendon slices (dry weight 0.740 part). The tendon slices are contained in a stainless steel basket that is immeresed in the borohydride solution without agitation for 18 hours. The pH of this sodium borohydride solution is 10.4. After 18 hours, the sodium borohydride solution is drained off, and the tendon slices are washed three times with agitation in 100 parts of water.

The washed slices are then immersed in 100 parts of a swelling solution consisting of 0.4 percent cyanoacetic acid dissolved in a 50–50 mixture of water and methanol. This swelling solution is maintained at room temperature (22° C.).

After 1.5 hours in this swelling solution, the total weight of the swollen slices increases to 26.42. After 3.0 hours in the swelling solution, the weight of the tendon slices is 29.85. After 6.0 hours in the swelling solution, the weight of the tendon slices is 32.09. The weight of the tendon slices is 39.52 after 18 hours in the swelling solution.

Table 1, which follows this example, summarizes the results of 12 experiments in which the concentration of sodium borohydride is changed from 0.25 molar to 1.5 molar, and the temperature of the sodium borohydride solution is reduced from 36° C. to 7° C. In each experiment, the swollen collagen fibrils disperse readily throughout the swelling solution when agitated.

Example II

The procedure described in Example I above is repeated with 2.407 parts of tendon slices (0.800 part dry weight). A 0.05 percent solution of ficin is substituted for the sodium borohydride, and the tendon slices are immersed in the ficin solution without agitation for 18 hours. The temperature of the ficin solution is maintained at 25° C. The ficin treated slices are washed with water and immersed in the swelling solution described in Example I above.

After 1.5 hours in this swelling solution, the total weight of the swollen slices increases to 23.45. After 3 hours in the swelling solution, the weight of the tendon slices is 30.12. The weight of the tendon slices is 30.67 after 6 hours and 36.17 after 18 hours in the swelling solution.

Example III

The procedure described in Example I above is repeated, substituting for the sodium borohydride a solution of potassium borohydride maintained at 26° C. Table 2. which follows this example summarizes the results of 4 experiments in which the concentration of potassium borohydride is changed from 0.1 molar to 1.0 molar. In each experiment, the swollen collagen fibrils disperse readily throughout the swelling solution when agitated.

Example IV

Example I was repeated using a lower concentration of sodium borohydride (0.25 molar) and reducing the pre-swelling time (½ hour to 5 hours). The results are summarized in Table 3.

Example V

Hide corium is defatted by acetone treatment and dried. (This is not a necessary step.) The dry hide is rehydrated in water, heated for 10 minutes at 65° C., and cooled for about 2 hours at 5° C. The renatured hide is immersed in 0.5 percent sodium borohydride solution (other borohydrides, such as, potassium, tetramethyl ammonium are also effective) for about 48 hours after which it is washed with water to neutrality. The wet hide remains intact but

TABLE 1

| Experiment | $NaBH_4$ | Temperature (deg.) | Pre-swelling time (hrs.) | Weight, slices | Weight, solids | Weight of slices after swelling ||||  Swelling index ||||
|---|---|---|---|---|---|---|---|---|---|---|---|---|---|
| | | | | | | 1.5 hrs. | 3 hrs. | 6 hrs. | 18 hrs. | 1.5 hrs. | 3 hrs. | 6 hrs. | 18 hrs. |
| 1 | 0.25M | 36 | 18 | 2.319 | 0.768 | 25.95 | 28.99 | 30.77 | 35.30 | 34.0 | 37.6 | 40.2 | 46.0 |
| 2 | 0.5M | 36 | 18 | 2.457 | 0.820 | 30.29 | 35.09 | 37.75 | 45.29 | 37.0 | 42.7 | 46.0 | 55.0 |
| 3 | 1.0M | 36 | 18 | 2.231 | 0.740 | 26.42 | 29.85 | 32.09 | 39.52 | 35.5 | 41.6 | 43.5 | 53.2 |
| 4 | 1.5M | 36 | 18 | 2.039 | 0.675 | 31.32 | 36.62 | 39.34 | 45.27 | 46.5 | 54.2 | 58.0 | 67.0 |
| 5 | 0.25M | 7 | 18 | 2.424 | 0.800 | 31.62 | 35.42 | 37.02 | 39.47 | 39.50 | 44.1 | 46.2 | 49.2 |
| 6 | 0.5M | 7 | 18 | 2.223 | 0.738 | 25.69 | 29.37 | 30.49 | 33.82 | 35.0 | 39.7 | 41.5 | 45.7 |
| 7 | 1.0M | 7 | 18 | 2.370 | 0.785 | 28.50 | 32.48 | 33.90 | 40.65 | 36.4 | 41.4 | 42.0 | 51.6 |
| 8 | 1.5M | 7 | 18 | 2.260 | 0.750 | 26.72 | 31.52 | 32.54 | 36.17 | 35.5 | 42.0 | 43.6 | 48.2 |
| 9 | 0.25M | 25 | 65 | 2.235 | 0.741 | 26.82 | 30.17 | 32.52 | 37.22 | 36.2 | 40.5 | 44.0 | 50.0 |
| 10 | 0.5M | 25 | 18 | 2.619 | 0.870 | 27.08 | 31.38 | 36.28 | 42.34 | 31.2 | 36.0 | 41.7 | 48.5 |
| 11 | 1.0M | 25 | 18 | 2.472 | 0.820 | 29.56 | 33.15 | 34.70 | 40.67 | 36.20 | 40.50 | 42.25 | 49.5 |
| 12 | 1.5M | 25 | 18 | 2.117 | 0.700 | 31.32 | 35.87 | 41.49 | 45.12 | 44.60 | 51.0 | 59.1 | 64.5 |
| 13 | Water | 25 | 18 | 2.350 | 0.775 | 20.55 | 21.82 | 22.60 | 24.00 | 26.40 | 28.0 | 29.1 | 31.0 |

TABLE 2

| Experiment | Temperature (deg.) | $KBH_4$ | Starting pH | Residence time (hrs.) | Weight, slices | Weight, solids | Weight of slices after swelling |||| Swelling index ||||
|---|---|---|---|---|---|---|---|---|---|---|---|---|---|---|
| | | | | | | | 1.5 hrs. | 3 hrs. | 5 hrs. | 18 hrs. | 1.5 hrs. | 3 hrs. | 5 hrs. | 18 hrs. |
| 1 | 26 | 1.0M | 11.5 | 18 | 2.416 | 0.800 | 35.29 | 40.39 | 45.29 | 53.09 | 44.0 | 50.5 | 56.5 | 66.2 |
| 2 | 26 | 0.5M | 11.4 | 18 | 2.584 | 0.855 | 32.92 | 35.27 | 39.02 | 45.82 | 38.5 | 41.2 | 46.0 | 54.0 |
| 3 | 26 | 0.25M | 11.2 | 18 | 2.336 | 0.770 | 31.41 | 34.41 | 37.61 | 41.51 | 40.60 | 44.70 | 48.80 | 54.0 |
| 4 | 26 | 0.1M | 10.8 | 18 | 2.700 | 0.890 | 30.90 | 33.28 | 35.27 | 38.55 | 34.75 | 37.30 | 39.60 | 43.30 |

TABLE 3

| Experiment | $NaBH_4$ | Temperature (deg.) | Weight, slices | Weight, solids | Residence time hrs. | Weight of slices after swelling ||| Swelling index |||
|---|---|---|---|---|---|---|---|---|---|---|---|
| | | | | | | 2 hrs. | 4 hrs. | 18 hrs. | 2 hrs. | 4 hrs. | 18 hrs. |
| 5 | 0.25M | 25 | 2.796 | 0.920 | ½ | 19.14 | 19.99 | 22.64 | 20.8 | 21.7 | 24.6 |
| 6 | 0.25M | 25 | 2.543 | 0.840 | ¾ | 25.82 | 27.27 | 30.72 | 30.6 | 32.4 | 36.6 |
| 7 | 0.25M | 25 | 2.306 | 0.760 | 1 | 21.85 | 24.25 | 27.10 | 28.8 | 32.1 | 36.0 |
| 1 | 0.25M | 25 | 2.346 | 0.776 | 2 | 26.49 | 29.12 | 34.57 | 34.2 | 37.5 | 48.5 |
| 2 | 0.25M | 25 | 3.770 | 1.260 | 3 | 40.72 | 44.72 | 53.77 | 32.5 | 35.5 | 42.6 |
| 3 | 0.25M | 25 | 2.638 | 0.820 | 4 | 34.25 | 36.17 | 43.70 | 41.7 | 43.8 | 53.2 |
| 4 | 0.25M | 25 | 2.948 | 0.975 | 5 | 35.34 | 38.00 | 48.99 | 36.2 | 39.0 | 50.5 | is now very labile to mechanical deaggregation into collagen fiber bundles of lenths approximating that found in the native skin. After washing and dehydrating, 65–80 percent of dry collagen fibers are obtained which disperse in water to a free, easily filtered floc resembling cellulose fibers. Acidification with acetic acid swells the collagen fibers, but mechanical treatment is required to convert them to the viscous fibrillar state.

Example VI

Slices of rattail tendon are treated with sodium borohydride in accordance with the procedure described in Example I above. The slices are washed with water and swollen as described in that example to produce a dispersion of swollen collagen fibrils.

Example VII

The procedure of Example V is repeated substituting sheepskin collagen for cowhide corium. A viscous fibrillar dispersion of collagen is obtained, after acidification and mechanical disruption.

Example VIII

Fish skin collagen is cleaned, descaled, and cut into small pieces having areas of about 1 square centimeter. To 100 parts of a one molar solution of sodium borohydride maintained at a temperature of 36° C. is added 2.231 parts of the slices (dry weight 0.740 part). The slices are contained in a stainless steel basket that is immersed in the borohydride solution maintained at 10° C. without agitation for 18 hours. The pH of this sodium borohydride solution is 10.4. After 18 hours, the sodium borohydride solution is drained off, and the tendon slices are washed three times with agitation in 100 parts of water.

The washed slices are then immersed in 100 parts of a swelling solution consisting of 0.4 percent cyanoacetic acid dissolved in a 50–50 mixture of water and methanol. This swelling solution is maintained at 10° C. The swollen collagen fibrils disperse readily through the swelling solution when agitated.

Example IX

Five parts of iththycol of swim bladders of fish is cleaned and cut into small pieces having areas of about 1 square centimeter. To 100 parts of a 1 molar solution of tetramethyl ammonium borohydride maintained at a temperature of 10° C. is added 2 parts of the iththycol slices. After 4 hours, the slices are drained and washed 3 times with agitation in 100 parts of water. The washed slices are then immersed in 100 parts of a swelling solution consisting of 0.4 percent acetic acid dissolved in a 50–50 mixture of water and methanol. This swelling solution is maintained at 10° C. The swollen collagen disperses readily throughout the swelling solution when agitated.

What is claimed is:

1. In a process for preparing a dispersion of swollen collagen in an aqueous acid solvent, the improvement comprising: treating finely-divided collagen for a period of 4 to 18 hours with a solution of a borohydride at a temperature within the range of from 7° to 36° C., and then swelling the collagen in an aqueous acid solvent.

2. The process of claim 1, wherein the finely-divided collagen is treated with a solution of tetramethyl ammonium borohydride.

3. The process of claim 1, wherein the finely-divided collagen is treated with a solution of an alkali metal borohydride at a temperature within the range of from 7° C. to 36° C., the pH of the treating solution being within the range of from 10.3 to 11.5.

4. The process of claim 3, wherein the finely-divided collagen is treated with a solution of sodium borohydride.

5. The process of claim 3, wherein the finely-divided collagen is treated with a solution of potassium borohydride.

6. The process of claim 4, wherein the sodium borohydride solution is a 0.25 molar solution.

7. The process of claim 1, wherein the finely-divided collagen is tendon slices.

8. The process of claim 1, wherein the finely-divided collagen is cowhide.

References Cited

UNITED STATES PATENTS

| | | | |
|---|---|---|---|
| 2,105,036 | 1/1938 | Freudenberg | 162—2 X |
| 2,934,446 | 4/1960 | Highberger | 162—151 X |

FOREIGN PATENTS

| | | |
|---|---|---|
| 692,749 | 8/1964 | Canada. |

HOWARD R. CAINE, Primary Examiner

U.S. Cl. X.R.

8—94.1; 162—144, 151